United States Patent

Haddad et al.

Patent Number: 5,519,346
Date of Patent: May 21, 1996

[54] SELECTIVE RESTART CIRCUIT FOR AN ELECTRONIC DEVICE

[75] Inventors: Kenneth R. Haddad, Arlington Heights; John J. Janssen, Round Lake Beach, both of Ill.

[73] Assignee: Motorola, Inc., Schaumburg, Ill.

[21] Appl. No.: 263,595

[22] Filed: Jun. 22, 1994

[51] Int. Cl.⁶ ............................................. H03K 17/22
[52] U.S. Cl. ........................ 327/143; 327/198; 327/225
[58] Field of Search ................................. 327/142, 143, 327/198, 225, 545, 546

[56] References Cited

U.S. PATENT DOCUMENTS

| | | | |
|---|---|---|---|
| 3,894,247 | 7/1975 | De Jong | 327/143 |
| 4,245,150 | 1/1981 | Dricoll et al. | 327/143 |
| 4,446,381 | 5/1984 | Dalrymple | 327/143 |
| 4,581,552 | 4/1986 | Womack et al. | 327/142 |
| 4,654,821 | 3/1987 | Lapp | 364/900 |
| 4,716,322 | 12/1987 | D'Arrigo et al. | 327/143 |
| 4,716,510 | 12/1987 | Pace et al. | 363/49 |
| 4,873,712 | 10/1989 | Porco | 379/58 |
| 5,159,206 | 10/1992 | Tsay et al. | 327/143 |
| 5,229,815 | 7/1993 | Sulenski | 355/207 |
| 5,359,233 | 10/1994 | Mumper et al. | 327/143 |
| 5,369,310 | 11/1994 | Badyal et al. | 327/143 |
| 5,428,765 | 6/1995 | Moore | 395/550 |

*Primary Examiner*—Terry Cunningham
*Attorney, Agent, or Firm*—Dale B. Halling; Donald C. Kordich

[57] ABSTRACT

Radiotelephones often are powered by batteries (12). When a radiotelephone is bumped, the battery (12) can lose electrical contact with the radiotelephone. When power is interrupted (40), a timer is started (42). When the power is reapplied (44), the timer is sampled (46) and compared against a predetermined period of time. If the power was interrupted for a short time, then the radiotelephone is turned on (50). If the power was interrupted for a long time, then the radiotelephone stays off (48). The timer in the circuit is implemented as an RC circuit (26) starts to discharge. If the voltage level falls below Vref, the radiotelephone will not turn on when the power is reapplied.

5 Claims, 4 Drawing Sheets

5,519,346

SELECTIVE RESTART CIRCUIT FOR AN ELECTRONIC DEVICE

FIELD OF THE INVENTION

The present invention relates to the field of controlling regulated power supplies and, more specifically to a method and apparatus for selectively reapplying the power supply.

BACKGROUND OF THE INVENTION

Radiotelephones, in order to be portable, are often powered by batteries. When the radiotelephone is bumped or dropped, the batteries lose electrical contact with the radiotelephone interrupting the power supply. This results in the radiotelephone being turned off. A number of mechanical solutions have been tried, but none have been able to eliminate this concern.

As a result a number of electronic approaches have been tried. One approach has been to always restart the radio once power is available, and use a timer to determine how long the battery or power source has been interrupted. If the power source has been interrupted for a short period of time, the radiotelephone will stay powered on. A short interruption of the power supply is assumed to be unintentional. However, if the power source has been interrupted for a long period of time, the radiotelephone is turned off. A long interruption of the power supply is assumed to be intentional. The user can be confused by this approach, since he sees his radiotelephone turn on and then turn off for no apparent reason. Another drawback of this approach is that the battery power is wasted in turning the radiotelephone on just to determine that it needs to be turned off.

Another approach has been to start a timer when the power supply is interrupted and to only attempt to restart the radiotelephone after a predetermined period of time has passed. If the power supply has been reapplied, then the radiotelephone will turn on, otherwise it will not turn on. This results in an inherent delay in restarting the radiotelephone every time the power source of the radiotelephone is interrupted. As a result incoming telephone calls may be missed. Additionally it can add delay to the start up time when the user wants to intentionally turn on the radiotelephone.

Thus there exists a need for a device which can solve these and other problems resulting from power interruptions in a radiotelephone.

DESCRIPTION OF THE PREFERRED EMBODIMENT

Figure 1:
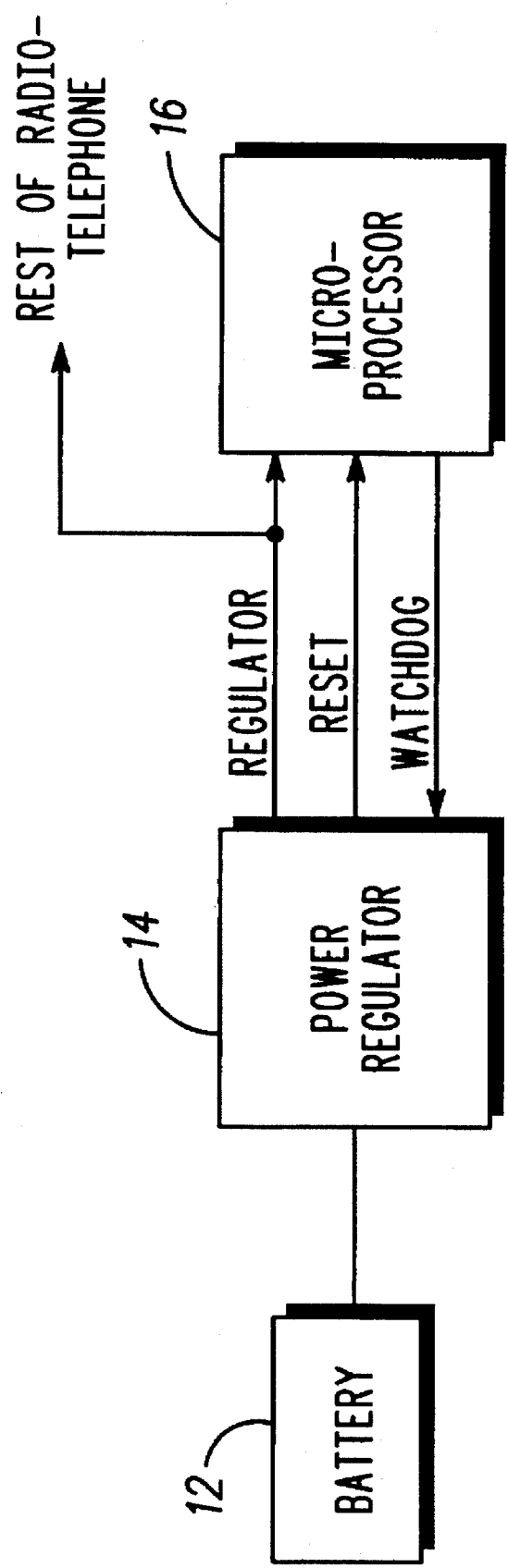
FIG. 1 is a block diagram of a power control section of a radiotelephone.

FIG. 1 is a block diagram of the power control section of a radiotelephone. A battery 12 provides power to a power regulator 14 which provides regulated power to a microprocessor 16 as well as the rest of the radiotelephone. The power regulator 14 provides a reset signal connected to the microprocessor 16 which is true if the power conditions meet the operating requirements. The microprocessor 16 provides a watch dog signal connected to the power regulator 14 which is true when the microprocessor 16 determines that the regulated power should be on.

Figure 2:
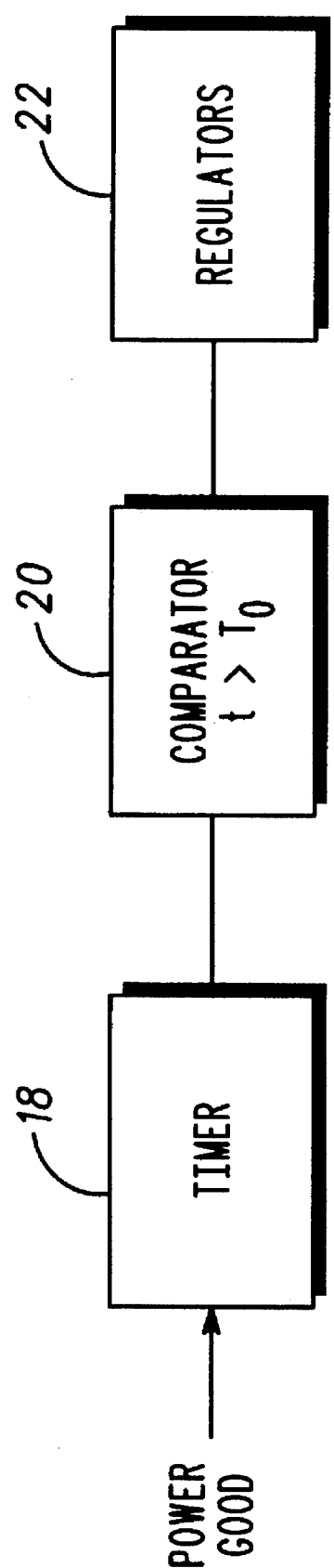
FIG. 2 is a block diagram of a power regulator of the radiotelephone.

FIG. 2 shows a more detailed block diagram of the operation of the power regulator 14. A timer 18 has a power good signal input and measures the period of time during which the power source or battery 12 is interrupted. This is accomplished by measuring the time during which the power good signal is false. This time period is used by a comparator 20 to determine if the power source 12 was interrupted for less than a predetermined period of time. If the comparator 20 determines that the interruption time was less than the predetermined period of time then a regulator 22 is directed to restart. This returns the radiotelephone to normal operation after the power source 12 has been interrupted.

Figure 3:
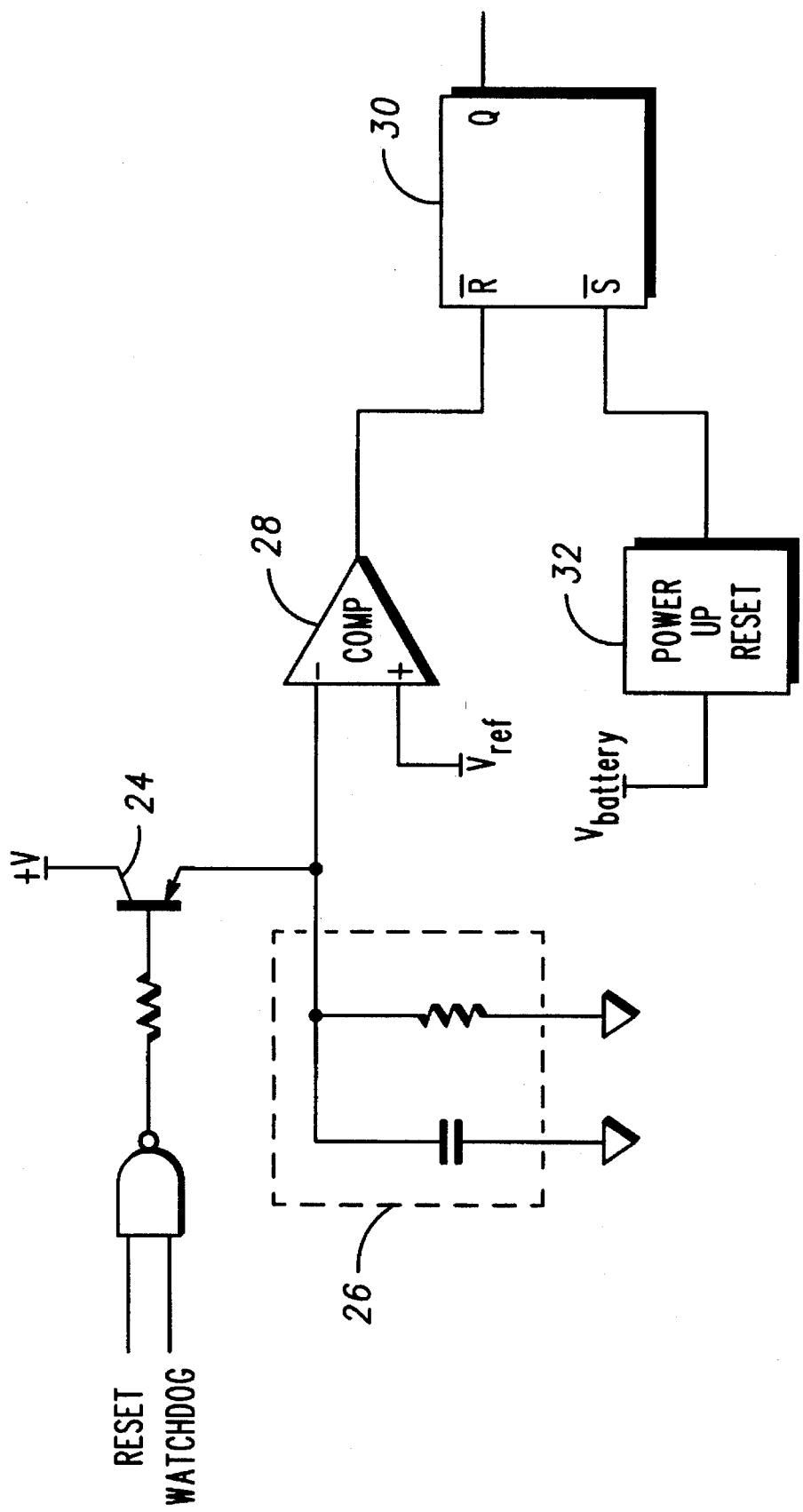
FIG. 3 is a circuit diagram of the power regulator of FIG. 2.

A circuit diagram of the timer 18 and comparator 20 is shown in FIG. 3. A regulated voltage, +V, is connected to the emitter of a transistor 24. The transistor 24 allows a RC circuit 26 to charge when the reset signal and watch dog signal are logic ones. When power is interrupted the reset signal or the watch dog signal become logic zeros and the RC circuit 26 starts to discharge. A comparator 28 has as its negative input the output of the RC circuit 26 and a reference voltage, Vref, as its positive input. The output of the comparator 28 is connected to the reset bar input of an RS flip flop 30. The set bar of the RS flip flop 30 is connected to a power up reset circuit 32. The power up reset circuit 32 monitors the battery voltage and provides a logic one output when the battery voltage is in an acceptable range. The output of the RS flip flop 30 adopts the same logical state as reset the bar when the set bar transitions from a logic zero to a logic one. If the output is a logic zero, the radiotelephone is directed to restart. If the output is a logic one, the power source has been interrupted for more than a predetermined period of time and the radiotelephone is directed to stay off.

Figure 4:
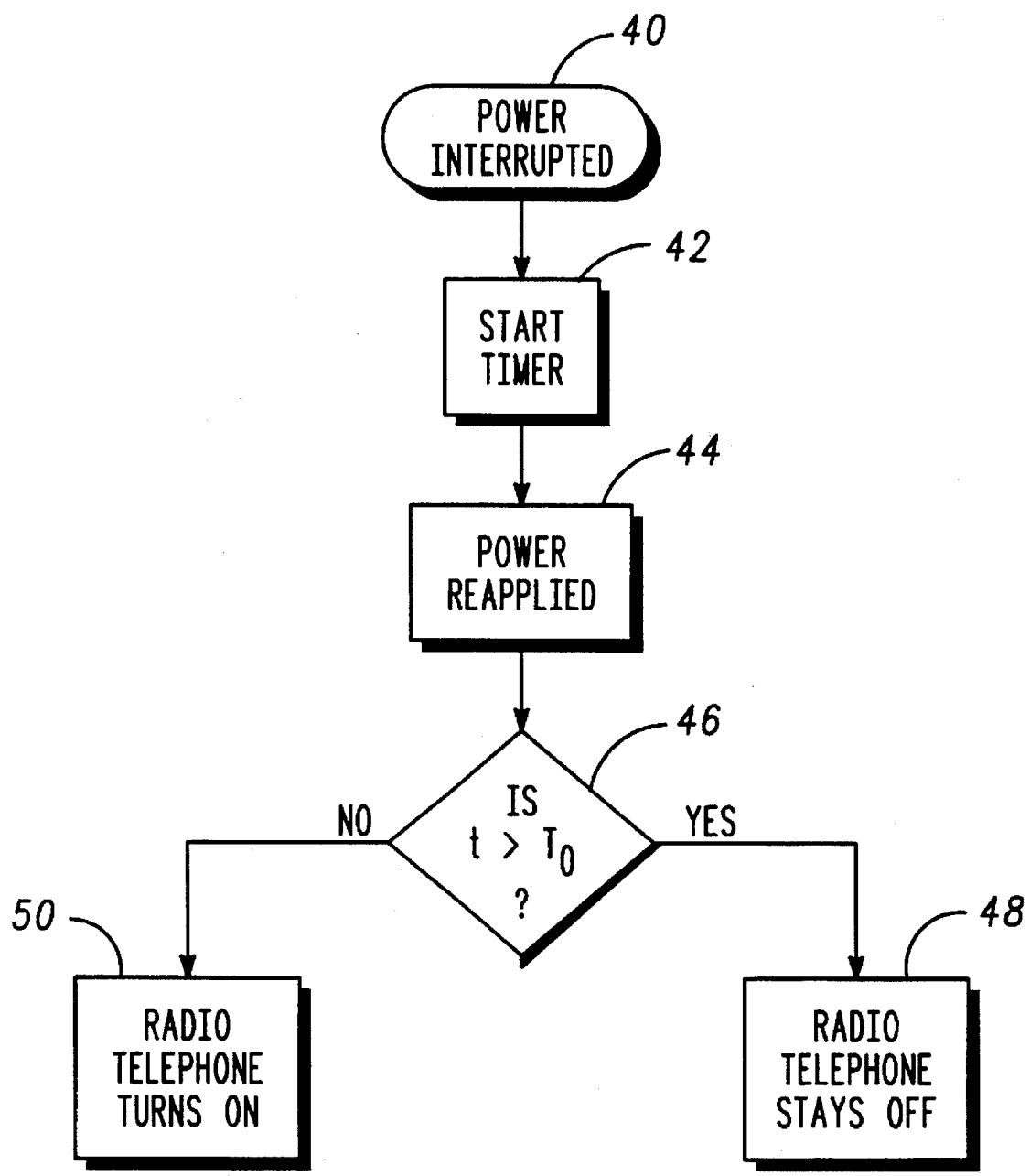
FIG. 4 is a flow chart of the process to determine if the power source was intentionally interrupted.

FIG. 4 is a flow chart of the process used to determine whether the power source was unintentionally interrupted. The process begins at block 40 with the power being disrupted. Next, a timer is started at block 42. When power is reapplied at block 44, the timer is sampled and it is determined if the power source 12 was interrupted for more than a predetermined period of time, at block 46. If the interruption time was longer than the predetermined period of time, the radiotelephone is directed to stay off, at block 48. If the interruption time was shorter than the predetermined period of time, the radiotelephone is directed to restart at block 50.

When the radiotelephone is bumped or dropped contact between the power source and the radiotelephone may be disrupted. This results in interruption of the power to the radiotelephone and causes the radiotelephone to unintentionally turn off. The invention provides a timer which measures the power source interruption period. If this interruption period is greater than a predetermined period of time, the most likely cause was an intentional disruption of the power supply 12 as a result the radiotelephone does not restart when power is reapplied. If the power interruption was for a short period of time, then the most likely cause was an unintentional disruption of the power supply usually caused by dropping or bumping the radiotelephone. When the power supply 12 has been unintentionally disrupted, the radiotelephone user wants the radiotelephone to restart as soon as possible. This invention provides this by making the restart decision before the radiotelephone is turned on. By not turning on the radiotelephone to make the restart decision, power is saved and the user does not see his radiotelephone inexplicably turn on and then off.

This invention can be practiced in a wide variety of electronic devices including pagers, portable computers, cordless telephones and any electronic device whose power supply is interrupted. It is obvious to those skilled in the art that a number of modifications can be made to the invention without departing from the spirit of the invention. These include, but are not limited to, replacing the RC circuit with a standard timer, and implementing the invention in the firmware of a microprocessor. For an understanding of the scope of the invention, reference should be made to the attached claims.

We claim:

1. A restart circuit for a portable communication device, comprising:

a power source for providing power to the portable communication device;

a charging circuit connected to the power source, controlled by a charging enable signal;

a RC timer circuit charged by the charging circuit when the charging enable signal is true and discharging when the charging enable signal is false;

a comparator connected to the output of the RC timer and to a reference voltage;

a power up reset circuit connected to the power source, having an output signal indicative of a power good condition; and a logic circuit connected to the output of the comparator and the output of the power up reset circuit, said logic circuit output adopting the same state as the comparator output when the power up reset circuit transitions from a power not good to a power good signal.

2. The restart circuit of claim 1, wherein the power source is a battery.

3. The restart circuit of claim 1, wherein the charging enable circuit is false when a user wants to turn off the portable communication device.

4. The restart circuit of claim 1, wherein the charging enable signal is true when the portable communication device is in normal operation.

5. The restart circuit of claim 1, wherein the logic circuit is a flip flop.

* * * * *